(No Model.)
G. W. HUCKABAY.
VEHICLE BRAKE.
No. 398,399. Patented Feb. 26, 1889.
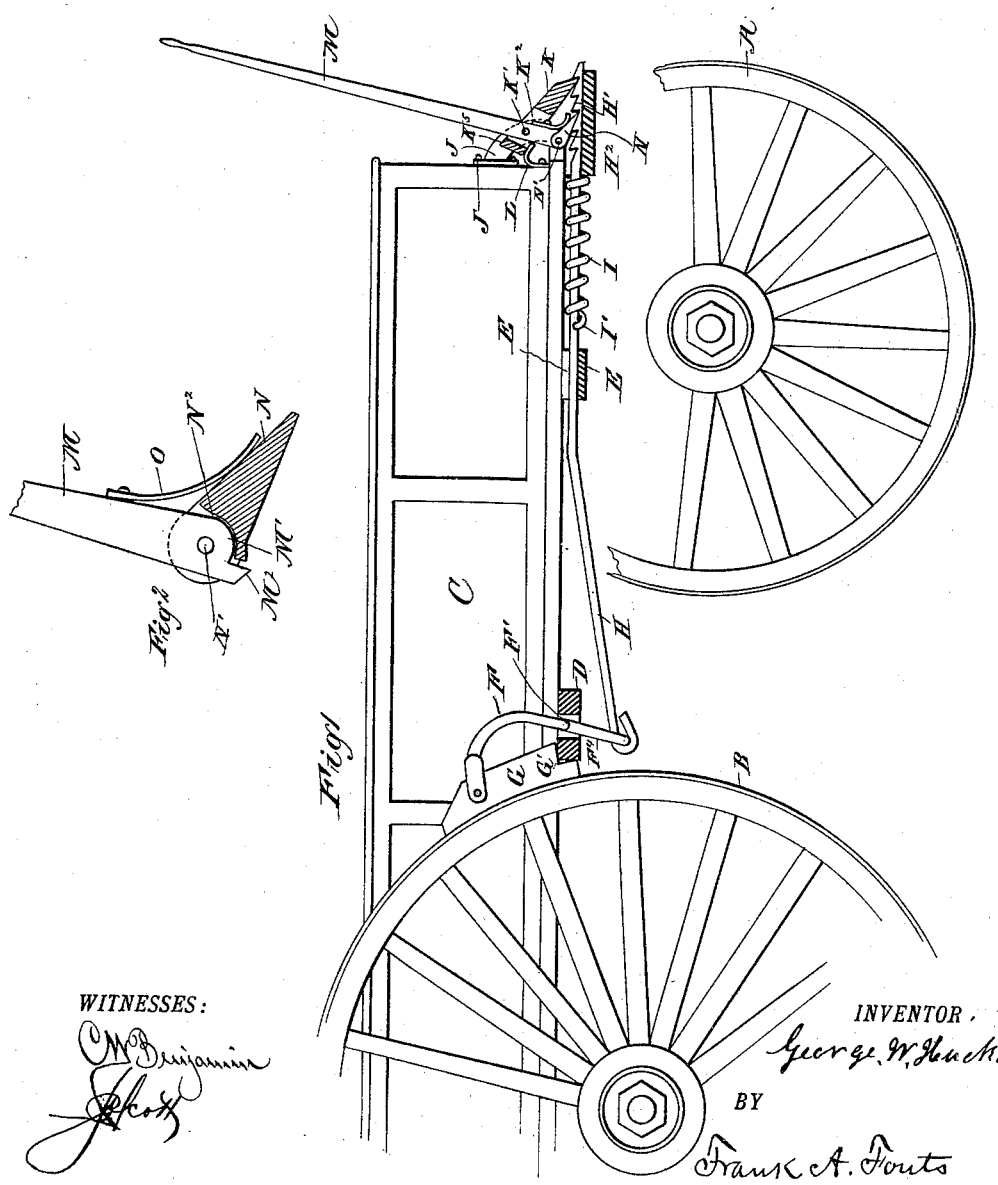
WITNESSES:
INVENTOR.
George W. Huckabay
BY
Frank A. Fouts
ATTORNEY

UNITED STATES PATENT OFFICE.

GEORGE W. HUCKABAY, OF GARFIELD, LOUISIANA.

VEHICLE-BRAKE.

SPECIFICATION forming part of Letters Patent No. 398,399, dated February 26, 1889.

Application filed September 12, 1888. Serial No. 285,203. (No model.)

*To all whom it may concern:*

Be it known that I, GEORGE W. HUCKABAY, a citizen of the United States, and a resident of Garfield, in the parish of Caddo and State of Louisiana, have invented certain new and useful Improvements in Vehicle-Brakes, of which the following is a specification.

The object of my invention is to provide a vehicle with a brake to be actuated by a lever and a spring; and it consists in the parts which will be hereinafter described, and pointed out in the claims.

Reference is herein had to the accompanying drawings, forming part of this specification, in which similar letters of reference indicate corresponding parts in the two figures.

Figure 1 represents a side elevation, partly in section, of a wagon provided with my improvement; and Fig. 2 is an enlarged detail side elevation of the lever and its jointed dog.

A represents the front wheel of a vehicle; B, the rear wheel, and C the bed thereof. The under side of the bed is provided with three cross-pieces, D, E, and $H^2$, rigidly secured thereto. A rear lever, F, is fulcrumed at F' to the cross-piece D, and the upper end of said lever is provided with a brake-shoe, G, the under outer side of said shoe provided with a notch, G'. A brake-rod, H, has its inner end jointed to the lower end of the lever F, said rod extending forward through an opening, E', in the cross-piece E, and thence extending farther forward, so as to rest on the upper side of the cross-piece $H^2$ aforesaid. The outer upper side of the rod H is provided with a series of notches, H'. The said rod is also provided with a spiral spring, I, the inner end, I', of said spring being fixed to the rod, the outer end of said spring resting against the inner end of the cross-piece $H^2$.

J is a bracket secured to the front end of the bed by bolts J'.

K is a pawl pivotally secured by pin K' to the bracket J, said pawl being provided with an opening, $K^2$. A spring, L, has one end secured to the bed, the outer end of said spring resting under the heel of the pawl.

M is a hand-lever fulcrumed by pivotal pin K' within the opening $K^2$ in the pawl. The said pin K' is fixed to the bracket and extends through the pawl and lever, serving as a pivot for one and a fulcrum for the other. A dog, N, has its heel jointed by pin N' to the lower end of the lever M. The under side of said lever is rounded at M', and also provided with a short projection, $M^2$. The dog is recessed at $N^2$ for the reception of the lower end of the lever. The lower front side of the lever is provided with a spring, O, which bears against the upper side of the dog N.

The operation is as follows: By moving the lever M backward to a limited extent the dog N will engage a notch, H', and move the rod H outward and set the brake. By reciprocating the said lever the dog will successively engage the notches aforesaid, so as to apply the brake to any extent desired. As the rod I is forced forward by the lever and dog, the point of the pawl K successively engages the notches H', so as to firmly retain the rod H and hold the brake in a set position as long as desired. As the brake is set, the spiral spring I is compressed, and when the brake is released the said spring will force the rod H inward, and through the medium of the lever F move the brake-shoe G away from the wheel B. When the said shoe engages the wheel, the notch $G^2$ thereof locks with the cross-piece D, and thereby forms a fulcrum for the shoe. As before stated, a limited reciprocal movement of the lever M sets the brake. By moving said lever inward beyond the limit the heel-piece $M^2$ thereof, Fig. 2, will lock with the dog N and elevate the said dog out of contact with the notches on the rod H. At the same time the rear part of the lever immediately back of its fulcrum K' will lock with the heel of the pawl, (marked $K^3$,) and thereby raise said pawl out of contact with the notches aforesaid, whereby the spiral spring I is left free to act and the brake released, as hereinbefore specified.

It should be understood that the lever-brake M is in the middle of a vehicle on the forward end thereof. The lever F is fork-shaped, the lever-arm $F^4$ thereof being under the center of the bed, each upper arm of said lever being provided with a brake-shoe, G.

Having thus described my invention, I claim as new and desire to secure by Letters Patent of the United States—

1. In a vehicle-brake, a spring-actuated brake-rod provided with notches, and a hand-lever provided with a dog and pawl for engaging said notches, substantially as specified.

2. In a vehicle-brake, a spring-actuated brake-rod provided with notches, and a hand-lever provided with a dog and pawl for engaging said notches, in combination with the lever F, notched brake-shoe G, and a block for engaging the notch in said shoe, substantially as specified.

3. In a vehicle-brake, a spring-actuated brake-rod provided with notches, a bracket provided with a pawl, the pawl being provided with an opening, a lever in said opening, a pin fixed to the bracket and extending through the pawl and lever aforesaid, and a dog jointed to said lever, substantially as specified.

4. In a vehicle-brake, a spring-actuated brake-rod provided with notches, a bracket provided with a spring-actuated pawl, the pawl being provided with an opening, a lever in said opening, a pin fixed to the bracket and extending through the pawl and lever aforesaid, the said lever being provided with a projection, $M^2$, a recessed dog jointed to the lower end of said lever, and a spring for holding the dog in engagement with the notches aforesaid, substantially as specified.

Signed at New York, in the county of New York and State of New York, this 10th day of September, A. D. 1888.

GEORGE W. HUCKABAY.

Witnesses:
J. P. SCOTT,
FRANK A. FOUTS.